United States Patent
Eisenmann et al.

(10) Patent No.: US 6,402,195 B1
(45) Date of Patent: Jun. 11, 2002

(54) DEVICE FOR ADJUSTING A VEHICLE HEAD SUPPORT AND A METHOD USING SUCH A DEVICE

(75) Inventors: Lutz Eisenmann, Vierkirchen; Yan Lu, Freising, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/549,571

(22) Filed: Apr. 14, 2000

(30) Foreign Application Priority Data

Apr. 14, 1999 (DE) .......................... 199 16 804

(51) Int. Cl.⁷ ............................................. B60R 21/32
(52) U.S. Cl. ...................................... 280/735; 297/410
(58) Field of Search ...................... 180/272; 280/735, 280/753; 297/400, 410, 391

(56) References Cited

U.S. PATENT DOCUMENTS

| | | | |
|---|---|---|---|
| 4,767,940 A | * 8/1988 | Tuttle | |
| 4,796,013 A |   1/1989 | Yasuda et al. | 340/562 |
| 5,006,771 A | * 4/1991 | Ogasawara | |
| 5,466,001 A | * 11/1995 | Gotomyo et al. | 280/735 |
| 5,525,843 A | * 6/1996 | Howling | 280/735 |
| 5,684,701 A | * 11/1997 | Breed | 280/735 |
| 5,770,997 A | * 6/1998 | Kleinberg et al. | 280/735 |
| 5,844,486 A | * 12/1998 | Kithil et al. | 280/735 |
| 5,848,661 A |   12/1998 | Fu | 180/273 |
| 6,042,145 A | * 3/2000 | Mitschelen et al. | 280/735 |
| 6,196,579 B1 | * 3/2001 | Bowers et al. | 280/735 |

FOREIGN PATENT DOCUMENTS

| | | |
|---|---|---|
| DE | 34 27 466 | 3/1985 |
| DE | 37 30 210 | 3/1989 |
| DE | 196 51 670 | 2/1998 |
| DE | 197 31 053 | 1/1999 |
| JP | 11-169258 | 6/1999 |

* cited by examiner

Primary Examiner—J. J. Swann
Assistant Examiner—Christopher Bottorff
(74) Attorney, Agent, or Firm—Crowell & Moring LLP

(57) ABSTRACT

In a device for adjusting a vehicle's head support with reference to the position of a passenger's head, with a sensor disposed in the head support for detecting the position of the head, the sensor contains two condenser plates which are arranged one above the other and are part of a condenser, in which the head of the passenger acts as a dielectric. In the method for the adjustment of the vehicle's head support, the height is varied, starting from a rest position with the head support retracted, to such an extent that the increase of the sensor signal of the one condenser plate takes place simultaneously with the decrease of the sensor signal of the other condenser plate.

11 Claims, 2 Drawing Sheets

DEVICE FOR ADJUSTING A VEHICLE HEAD SUPPORT AND A METHOD USING SUCH A DEVICE

BACKGROUND AND SUMMARY OF THE INVENTION

This application claims the priority of German Application No. 199 16 804.0, filed Apr. 14, 1999, the disclosure of which is expressly incorporated by reference herein.

The invention relates to a device for adjusting a vehicle head support and a method using such a device.

A device of this kind and a method of this kind are disclosed in German Patent document DE 34 27 466 A, wherein a pyroelectric detector, which responds to the thermal radiation of the passenger's head, is disposed approximately at the highest point of the head support. Starting from a rest position with the head support retracted, the detector receives the thermal radiation of the head and runs upward until it receives no more thermal radiation. It is then at about the same level as the passenger's vertex. Due to an appropriate arrangement it no longer receives any thermal radiation in this position. The head support is said to be thus correctly adjusted. It can easily be recognized that such a device is extremely imprecise and does not assure an exact setting of the head support height essential to the proper operation of the head support.

The invention addresses the problem of creating a device of the kind referred to above, in which, with little effort, a precise adjustment of the head support is possible, and of offering such a device by which this adjustment is performed.

The invention solves this problem by providing a device for adjusting a vehicle's head support to the position of a passenger's head, with a sensor arranged in the head support to recognize the head position, characterized in that the sensor contains two condenser plates which are arranged one over the other and are part of a condenser, in which the passenger's head acts as a dielectric. A method using such a device adjusts a vehicle's head support, characterized in that the height is varied starting from a rest position with the head support retracted until the increase of the sensor signal of the one condenser plate takes place simultaneously with the decrease of the sensor signal of the other condenser plate.

The special advantage of the device according to the invention consists in its insensitivity to the distance of the head from the head support. Even if the head is not in contact with the head support, the signal delivered by the two condenser plates remains the same in its relation. On account of the simple and inexpensive design and great insensitivity to temperature, the result is a sturdy and reliable device for setting the height of the head support.

The use of two condenser plates in connection with a car seat is known in itself. Thus, in U.S. Pat. No. 4,796,013, the two condenser plates are arranged in the seat or seat back and adjacent to the object (passenger), so that it is known whether the seat is occupied. Any safety systems, such as an airbag and the like, will then be deployed only if this is actually the case.

Other objects, advantages and novel features of the present invention will become apparent from the following detailed description of the invention when considered in conjunction with the accompanying drawings.

DETAILED DESCRIPTION OF THE DRAWINGS

Figure 1:
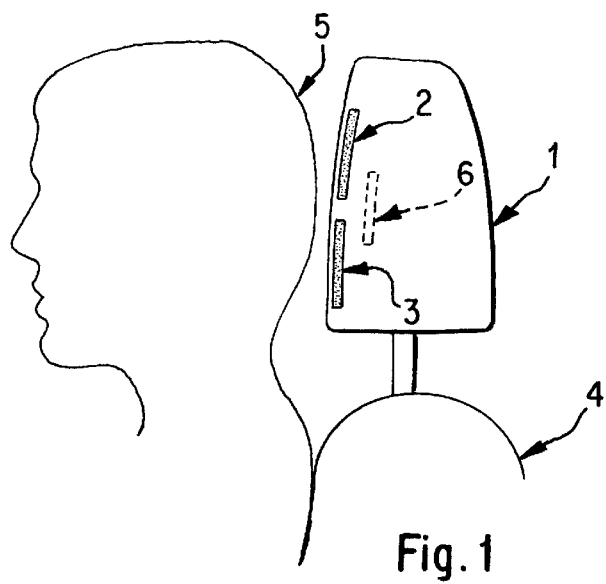
FIG. 1 is a schematic representation of the basic structure of a device according to the invention for adjusting a vehicle's head support.

In the embodiment in FIG. 1, in which a device of the invention is shown in section, two condenser plates 2 and 3 are situated in a head support 1. The head support can be moved by an electric motor drive (not shown) relative to the seat back 4 of a passenger seat; the height is to be adjusted so that the head support is aligned optimally with the position of a passenger's head 5.

The head 5 acts as a dielectric. If both the electrodes 2 and 3 are co-phasally excited, they give an output signal which, in comparison with the signal put out by the other condenser plate, shows a characteristic reaction at the optimum level of the head support 1.

Starting out from an arrangement of the head support in which it is fully retracted and rests with its bottom edge on the upper edge of the seat 4, the output signal of the condenser plate 2 increases with increasing height and then decreases again after the minimum distance is exceeded. At the same time, the sensor signal of condenser plate 3 at first likewise increases. From a comparison of the two sensor signals it is thus possible to determine the optimum setting of the head support 1. In the ideal case, with an appropriate geometrical configuration and arrangement of the two condenser plates, the sensor signal is approximately equal in the case of the optimal setting of the head support, as represented in FIG. 1.

Figure 2:
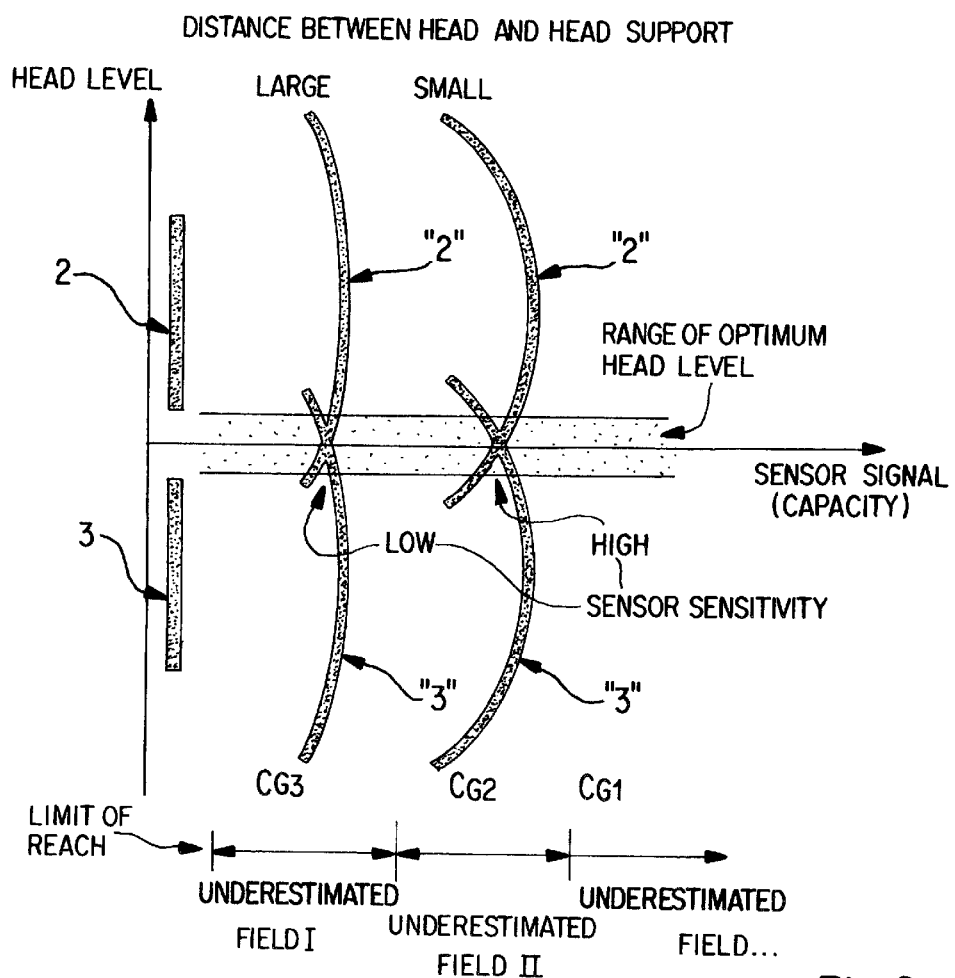
FIG. 2 is a diagram explaining the operation and execution of the method of the invention.

The shape of the sensor signals is represented in FIG. 2. Two cases are distinguished. In the first case, identified as "2" and "3", the head 5 is at a relatively great distance from the head support 1. The sensor signals, represented by their amplitudes, have the shape described.

In the other case, identified as "2'" and "3'", the head 5 is in the direct vicinity of the head support 1. The amplitudes are substantially greater than in the case previously considered. It is true in both cases, however, that the sensor signals have the described shape. In the ideal case of the setting of the head support, the sensor signals are both the same. Thus, the head support 1 can be adapted in a simple manner to the position of the head of the user of the vehicle.

Figure 3:
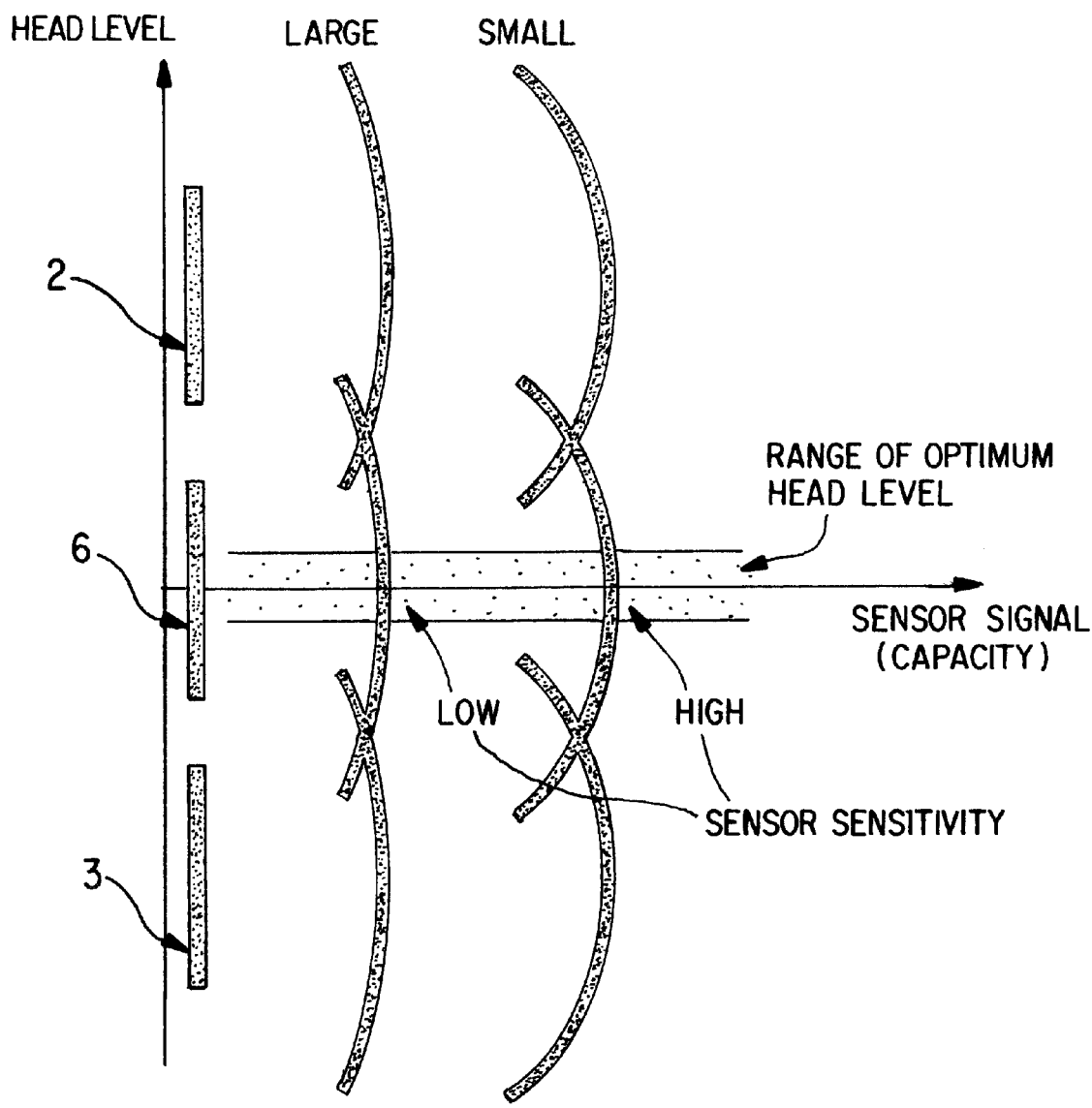
FIG. 3 is an additional diagram explaining the operation of an alternative embodiment according to the invention.

In the embodiment represented in FIG. 3 showing the shape of the sensor signals, an additional condenser plate, marked 6, is located between the condenser plates 2 and 3, and it is indicated in dotted lines in FIG. 1. The signal of this condenser plate runs precisely between the curves of the condenser plates 2 and 3 and has a peak at the ideal position of the head support. With this arrangement, by comparing the sensor signals of the three condenser plates or else by comparing only two condenser plates 2 and 6, or 3 and 6, or else also, 2 and 3, as represented in FIG. 1, the optimum height of the head support can be detected.

In any case, a sensor is involved which is insensitive to temperature and permits an exact setting of the head support.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for adjusting a vehicle's head support to the position of a passenger's head, comprising: a sensor arranged in the head support to recognize the head position relative to a height of the head support, wherein the sensor contains two condenser plates arranged one over the other as part of a condenser, in which the passenger's head acts as a dielectric;

wherein the arrangement and size of the two condenser plates is selected such that the signal emitted by both is equal when the head support is correctly set.

2. Device according to claim 1, further comprising a third condenser plate arranged between the two condenser plates.

3. Method for adjusting a vehicle's head support, comprising the acts of:

starting from a rest position with the head support retracted, varying a height of the head support; and stopping the height variation when an increase of a sensor signal of one condenser plate takes place simultaneously with a decrease of a sensor signal of another condenser plate, said one and another condenser plates being arranged one over the other in the head support as part of a condenser, in which the passenger's head acts as a dielectric.

4. Method according to claim 3, wherein the condenser plates are co-phasally excited.

5. A vehicle head rest, comprising:

a head support;

a sensor arranged in the head support to recognize a head position relative to a height of the head support, wherein the sensor contains two condenser plates arranged one over the other as part of a condenser, in which a passenger's head acts as a dielectric;

wherein the arrangement and size of the two condenser plates is selected such that the signal emitted by both is equal when the head support is correctly set.

6. Device according to claim 5, further comprising a third condenser plate arranged between the two condenser plates.

7. A method for adjusting a vehicle head support in relation to a passenger's head, the method comprising the acts of:

seating a passenger such that the passenger's head is in a vicinity of the head support, the head support having arranged therein two condenser plates one above the other as part of a condenser in which the passenger's head acts as a dielectric; and starting from a rest position with the head support retracted, varying a height of the head support at least until an increase of a sensor signal of one condenser plate takes place simultaneously with a decrease of a sensor signal of the other condenser plate.

8. The method according to claim 7, wherein the condenser plates are co-phasally excited.

9. The method according to claim 7, further comprising the act of correctly setting the head support when the signals emitted by the two condenser plates are equal.

10. Device for adjusting a vehicle's head support to the position of a passenger's head, comprising: a sensor arranged in the head support to recognize the head position, wherein the sensor contains two condenser plates arranged one over the other as part of a condenser, in which the passenger's head acts as a dielectric;

further comprising an excitation source that co-phasally excites both condenser plates.

11. A vehicle head rest, comprising:

a head support; and a sensor arranged in the head support to recognize a head position, wherein the sensor contains two condenser plates arranged one over the other as part of a condenser, in which a passenger's head acts as a dielectric;

further comprising an excitation source that co-phasally excites both condenser plates.

* * * * *